United States Patent Office 3,642,942
Patented Feb. 15, 1972

3,642,942
MODIFIED OXYMETHYLENE POLYMERS STABILIZED WITH PHOSPHITES
Claire Castner, Nutley, and Raymond A. Berard, Westfield, N.J., assignors to Celanese Corporation, New York, N.Y.
No Drawing. Filed Nov. 5, 1969, Ser. No. 874,386
Int. Cl. C08g *1/22, 51/58*
U.S. Cl. 260—858                    6 Claims

ABSTRACT OF THE DISCLOSURE

Polyoxymethylene compositions and the process for producing the same are described and claimed that include an oxymethylene polymer coupled by means of a diisocyanate to a dissimilar organic polymer and a stabilizer for the modified oxymethylene polymer. The polyoxymethylene compositions are useful as molded articles, film and the like.

INVENTION

The invention relates to a modified polyoxymethylene composition comprising an oxymethylene polymer coupled by means of a diisocyanate to a dissimilar organic polymer and an organic phosphite stabilizer for the oxymethylene based polymer.

Oxymethylene polymers having recurring —$CH_2O$— units have been known for many years. They may be prepared by polymerizing a source of oxymethylene units such as anhydrous formaldehyde or trioxane, a cyclic trimer of formaldehyde.

Oxymethylene polymers of improved thermal stability may be prepared by introducing into the polymer chains or attaching to the ends of the polymer chains, structures which are resistant to thermal detachment. The polymers may incorporate interspersed oxyalkylene units with adjacent carbon atoms and preferably oxymethylene units as disclosed in U.S. Pat. No. 3,027,352 of Walling, Brown and Bartz. Copolymers of this type may be described as having at least one chain containing oxymethylene (—$CH_2O$—) units (usually at least 85 mol percent) interspersed with (—OR—) units wherein R is a divalent radical containing at least two carbon atoms directly linked to each other and positioned in the chain between the two valences, with any substituent in the R radical being inert.

Specific interspersed monomeric units which may be incorporated are those derived from lactones, carbonates, cyclic acid anhydrides or ethylenically unsaturated compounds such as styrene, divinyl ether, vinyl acetate, vinyl methyl ketone or acrolein. The polymers may be endcapped as, for example, by acylation or etherification after polymerization or during polymerization by the use of selected chain transfer agents.

As used in the specification and claims, the term "oxymethylene polymers" denotes homopolymers and copolymers having at least 60% recurring oxymethylene units, and further includes substituted oxymethylene polymers, wherein the substituents are inert, i.e., do not participate in undersirable side reactions.

In accordance with this invention, the inclusion of oxymethylene polymers having branched chains (e.g. terpolymer and higher) is also provided for. Such polymers may be prepared by copolymerizing trioxane with a small amount of a chain branching agent, the small amount being sufficient to provide a branched oxymethylene structure but insufficient to make the polymers intractable by forming a highly cross-linked structure. Primary chains are linear chains comprising successively recurring oxymethylene units and are the chains which would be produced if the chain branching agent were omitted from the system. Suitable chain branching agents include those having at least two functional oxygen groups including (1) cyclic ethers having at least two cyclic ether rings and particularly those compounds having (a) at least two epoxy rings (b) at least two dioxacyclo rings, or (c) at least one epoxy ring and at least one dioxacyclo rings, and (2) compounds having at least two oxo groups such as dialdehydes and diketones, preferably having from 3 to 20 carbon atoms.

For some applications molecular modification of oxymethylene polymers is desirable to provide polymers of modified strength characteristics, flow characteristics, solvency, crystallinity, thermal stability, etc. Such molecular modification is particularly desirable where property modification by blending two polymers is impossible as, for example, by polymer incompatibility.

It has been found that such modified oxymethylene polymers may be prepared by the reaction of an isocyano (—NCO) or isothiocyano (—NCS) terminated polymer with a polymer having a terminal or pendant group containing active or acidic hydrogen as determined by the Zerewitnoff method.

The modified oxymethylene polymers may also be prepared by the coupling reaction of polymeric segments, at least one of which is an oxymethylene polymer, in the presence of a bifunctional coupling agent, and preferably those having at least one isocyano or isothiocyano group. In such a reaction system, an isocyano or isothiocyano prepolymer may be generated in situ, where a reaction with one polymeric segment is preferential over another, or coupling may occur through substantially simultaneous reactions of the coupling agent with the polymeric material.

Thus, the copolymers may be provided by the coupling of the polymeric chains in reaction with a bifunctional compound having at least one isocyano or isothiocyano group or by the reaction of a separately prepared isocyano or isothiocyano terminated prepolymer with another polymeric chain having a terminal or pendant group containing active or acidic hydrogen.

The presence of acidic hydrogen may be determined by the Zerewitnoff method, utilizing the reaction of such active, or acidic hydrogen compounds with Grignard reagents, liberating RH corresponding to RMgX. Thus, when a compound containing acidic hydrogen is reacted with methyl magnesium iodide, methane is liberated, giving a positive test. The amount of liberated methane may be collected and measured, and the number of active hydrogen atoms per mol determined, where the molecular weight is known. A further description of the Zerewitnoff test including modifications of the procedure for various applications, can be found in Grignard Reactions of Non-Metallic Substances, Kharasch, M. S., and Reinmuth, O. (Prentice-Hall, Inc., New York, 1954), pp. 1166–1174.

Suitable substituents containing active hydrogen include amino, amido, hydroxy, carboxy, mercapto, thiocarbonyl, —$CSNH_2$, —$SO_2NH_2$, $SO_2OH$, etc. Generally, substituents containing active or acidic hydrogen atoms are polar, due to their inclusion of atoms more electronegative than carbon, such as oxygen or nitrogen.

Substituents containing active hydrogen react with the isocyano or isothiocyano groups in the following manner:

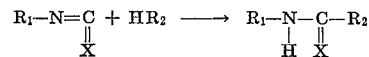

Thus, the copolymers contain the structure:

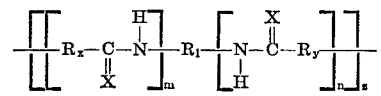

wherein $R_x$ is an oxymethylene polymer segment, X is an oxygen or sufur atom; $R_1$ is an organic radical derived from the coupling agent, and preferably represents a divalent aliphatic, cycloaliphatic, or aromatic moiety, including the substituted derivatives thereof, having up to about 20 carbon atoms; $R_y$ is any suitable organic polymeric segment; $m$ and $n$ are integers from one to two, and $m+n$ is an integer from two to three. The copolymers may, of course, comprise one or more such block structures, as indicated by the subscript Z which is an integer from 1 to about 100. $R_x$ and $R_y$ represent the residue of a polymer containing functional groups having active hydrogen atoms, and resulting from abstraction of the active hydrogen atoms from the aforesaid functional groups forming the termini of the designated polymeric segment. Thus, it is to be understood that in the specification and claims the polymeric segments $R_y$ and $R_x$ are inclusive of the pendent or terminal group through which the polymeric segment is bonded to the

group of the coupling agent.

For example, where the terminal group of the polymeric segment is a hydroxy group, reaction with a diisocyanate will result in the structure:

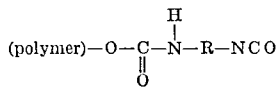

(where $R_x$ or $R_y$ would represent

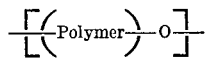

Similarly, where the terminal group is an amino group, reaction with a diisocyanate will result in the structure:

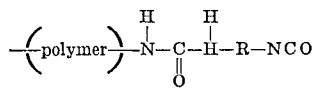

and $R_x$ and $R_y$ would represent

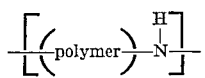

In the case of a carboxy terminal group, the resulting structure is

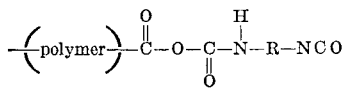

and $R_x$ and $R_y$ would represent

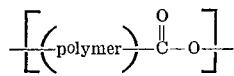

While a representation of the polymeric segments as inclusive of the substituent group is preferable considering the wide variety of groups containing active hydrogen which form the direct bond between the polymeric segment and the bifunctional coupling agent, a more limited class of block copolymers may be represented by the structure:

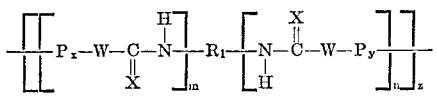

where W is oxygen, sulfur,

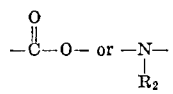

where $R_2$ may be hydrogen, alkyl having one to five carbon atoms, or halogen, $P_x$ is an oxymethylene polymer segment, $P_y$ is any suitable organic polymeric segment, and all other symbols are the same as described above.

Representative organic polymeric materials suitable for the co-polymer block thus include those having hydroxy, amino, amido, carboxy, mercapto, thiocarbonyl or other active hydrogen containing substituents, such as the polyethers, including, for example, the polymers and copolymers derived from ethylene glycol; propylene glycol; butylene glycol; pentamethylene glycol; heptamethylene glycol; octamethylene glycol; nonamethylene glycol; decanediol; 1,2-propylene glycol; 1,4-butylene glycol; 1,6-hexanediol; methylhexanediol; 1,4-butenediol; 2,2-dimethyl-1,3-propylene glycol; polystyrene glycol; the polyacetals, such as the polyoxymethylenes; the polyether-polyacetals such as the copolymer of ethylene oxide and trioxane; cellulose and its derivatives, such as the cellulose esters; polyesters (containing both hydroxy and carboxy groups), such as polyethylene terephthalate, poly (1,4-cyclohexanedicarbinyl terephthalate); polytetramethylene sebacate; the polycarbonates, such as poly [2,2-propanebis (4-phenyl carbonate)]; polyamides, such as the polysulfonamides, polycarbonamides, such as polyhexamethylene diamine adipate and the corresponding N-methoxylated polymers, etc.; mercapto containing polymers, such as the polythiomethylenes; the polyurethanes and mixtures and copolymers of the foregoing. Of course, each of the foregoing polymers may contain hydroxy, amino, etc. substituent groups at the terminus of the polymeric chain or at some intermediate position. Moreover, suitable polymers include those having a variety of active hydrogen containing substituents.

Thus, the suitable polymeric co-blocks include those having a polymeric backbone consisting of recurring atoms selected from the group consisting of oxygen, sulfur, carbon and nitrogen atoms comprising the hydrocarbon, oxahydrocarbon, thiohydrocarbon, amino hydrocarbon saturated and unsaturated polymers, etc. and which contain active-hydrogen-containing groups bonded to aliphatic, cycloaliphatic, and aromatic groups, including those containing heteroatoms selected from the group consisting of nitrogen, oxygen and sulfur (e.g. polyethylene glycol contains hydroxyaliphatic terminal groups; polyethylene terephthalate contains carboxyaromatic groups and hydroxyaralkyl groups; the polythiomethylenes contain mercaptoalkyl terminal groups; polyethylene diamine contains aminoaliphatic groups; the cellulose esters contain glucopyranose units having hydroxy groups bonded to an alkylheterocyclic moiety (where the hetero atom is oxygen) and hydroxy groups directly bonded to the heterocyclic moiety; the polycarbonates contain hydroxyaromatic groups.

In the most preferred embodiment, the oxymethylene polymer block is an oxymethylene copolymer which may be described as having at least one chain containing oxymethylene (—$CH_2O$—) units (usually at least 85 mol precent) interspersed with up to about 15 mol percent of (—OR—) units, wherein R is a divalent radical containing at least two carbon atoms directly linked to each other and positioned in the chain between the two valences, with any substituent in the R radical being inert. Suitable such copolymers may have a number of average molecular weight of from about 1000 up to about 80,000 or higher, with inherent viscosities ranging from about 0.2 to about 1.5 or higher. Dependent upon the type and extent of property modification sought, the low molecular weight, e.g. from about 1000 to about 10,000 or the high molecular weight 30,000 to 80,000 species may be preferred.

For chain extension, the polymers optimally contain no more than two active hydrogen atoms, preferably located at the termini of the polymeric chain. However, suitable polymers also include those having a plurality of active hydrogen atoms located in various positions on the polymeric chain. For example, such polymers are suitable for chain extension where the terminal active hydrogen atoms are more reactive than any located on the polymeric chain between the terminal positions, and may be particularly useful when a chain extended block copolymer capable of further crosslinking is desired. Of course, for a given molecular weight, increased functionality acts to increase the rate of polymer crosslinking.

The coupling agents are suitably bifunctional compounds having at least one isocyano (—NCO) or isothiocyano (—NCS) group, and preferably are organic diisocyanates (OCN—R—NCO), diisothiocyanates (SCN—R—NCS)

or isocyanate isothiocyanates (OCN—R—NCS), but may also be of higher functionality (e.g. triisocyanates, polyisocyanates, etc.).

A preferred class of coupling agents has the general formula R(NCX)$_n$ where X is an atom selected from the group consisting of oxygen and sulfur, $n$ is an integer between 1–3, and R is an organic radical derived from the group consisting of aliphatic, cycloaliphatic and aromatic moieties (hereinbefore defined), having one to twenty carbon atoms, and substituted derivatives thereof, where the substituents are inert i.e., do not participate in undesirable side reactions.

Suitable compounds include, for example, aromatic diisocyanates, such as 2,4 toluene, diisocyanate; 2,6 toluene diisocyanate; 1,6 toluene diisocyanate; diphenyl methane 4,4′ diisocyanate; 3,3′ dimethyl diphenyl methane 4,4′-diisocyanate; 3,3′ dimethyl 4,4′ diphenylene diisocyanate (3,3 bitoluene 4,4′ diisocyanate); m-phenylene diisocyanate; p-phenylene diisocyanate; o-phenylene diisocyanate; methane diisocyanate; chlorophenylene-2,4-diisocyanate; chlorophenylene 2,4 toluene diisocyanate 3,3′ dichlorodiphenyl-4,4 disocyanate; 4-chloro-1,3-phenylene diisocyanate; xylene 1,4 diisocyanate; dixylylene methane 4,4′ diisocyanate; 1,5 naphthalene diisocyanate, 1,4 napthalene diisocyanate, and the corresponding diisothiocyanates and the isocyanate isothiocyanates; alkylene diisocyanates, such as 1,6 hexamethylene diisocyanate; 1,2 ethylene diisocyanate; 1,3-propylene diisocyanate; 1,4 tetramethylene diisocyanate; 1,5 pentamethylene diisocyanate; and the corresponding diisocyanates and the isocyanate-isothiocyanates; alkylidene diisocyanates, such as ethylidene diisocyanate and propylidene diisocyanate and the corresponding diisothiocyanates and the isocyanate isothiocyanates; cyclo aliphatic diisocyanates, such as 1,3 cyclohexylene diisocyanate; 1,3 cyclopentylene diisocyanate; 1,4 cyclohexylene diisocyanate; 4,4′ methylenebis-(cyclohexyl isocyanate) and the corresponding diisothiocyanates and isocyanate-isothiocyanates; triisocyanates. such as triphenyl methane triisocyanate; 1,3,5 benzene triisocyanate, and the corresponding isothiocyanates and isocyanate isothiocyanates. Mixtures of any of the aforementioned compounds, such as mixtures of the 2,4 and 2,6 isomers of toluene diisocyanate, may also be desirable in certain applications.

The polymers may be provided in any molar ratio to allow variable modification in properties. For example, a 1:1 block copolymer of an oxymethylene polymer and a polyglycol may exhibit desirable properties, or it may be desirable to prepare on oxymethylene block copolymer having bonded thereto outer segments of polyether requiring a different molar ratio for its preparation. The amount of polymeric reactants provided may be varied at the original addition to the reaction zone, or an additional amount of an original reactant or even another reactant may be added during the course of the reaction. Similarly, additional catalyst and/or coupling agent may be advantageously provided during the course of the reaction.

While the coupling agent may be provided in variable amounts (e.g., to effect further reaction, or to provide isocyano or isothiocyano termination), the reagent is preferably provided in amounts between 0.5 mol and 3.0 mols (of isocyano, or isothiocyano groups per mol of active hydrogen defining one gram atom of active hydrogen as equal to one mol thereof). For chain extension, amounts between about 0.8 to 1.2 moles per mol active hydrogen of the polymeric block are preferably employed. An excess over the 1:1 stoichiometric ratio favors termination of the polymeric segments over coupling and at a molar ratio of 2:1 i.e. isocyano/active hydrogen, substantially no coupling occurs. Therefore, where an isocyano or isothiocyano terminated prepolymer is to be prepared, an excess over the 1:1 stoichiometric ratio and preferably a 2:1 or more excess is desirable.

It is known to stabilize such modified polyoxymethylene compositions by the incorporation of chemical stabilizers or a stabilizer system which would include an antioxidant ingredient (e.g. a substuted phenol) and a chain scission inhibitor (e.g. a trivalent nitrogenous composition). Such stabilizers, although effective in preventing thermal degradation of the base oxymethylene polymer are, however, relatively ineffective in stabilizing the entire modified compositions due primarily to the presence of urethane, ester and like linkages.

The subject invention is directed to a stabilizer for the previously described modified oxymethylene polymer. More particularly the subject invention relates to an organic phosphite stabilizer which may be defined as;

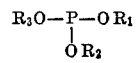

wherein $R_1$, $R_2$ and $R_3$ are organic radicals selected from the group of alkyl of from about 4 to about 12 carbon atoms, alkenyl of from about 6 to about 12 carbon atoms, cyclic alkyl aryl, alkyl mono and di substituted aryl, aryl substituted alkyl and aryl wherein alkyl is from about 4 to about 12 carbon atoms and aryl is 6 or 10 carbon atoms. Preferably $R_1$, $R_2$ and $R_3$ are all alkyl substituted aryl. Most preferred $R_1$, $R_2$ and $R_3$ are all mono or dinonyl substituted triphenyl.

Suitable organic phosphites are tridodecyl phosphite, trinonyl phosphite, trioctyl phosphite, triheptyl phosphite, tripentyl phosphite, tri t-butyl phosphite, tris (trimethylolpropane) phosphite, di-dodecyl t-butyl phosphite, dinonyl t-butyl phosphite, di-t-butyl nonyl phosphite, dioctyl pentyl phosphite, didodecyl 2,2 diethyloctyl phosphite, tridodecylene phosphite, trinonylene phosphite, trihexylene phosphite, mono- and dibutyl substituted triphenyl phosphite, mono- and dipentyl substituted triphenyl phosphite, mono- and dioctyl substituted triphenyl phosphite, mono- and dinonyl substituted triphenyl phosphite, mono and didodecyl substituted triphenyl phosphite, (octylphenyl) bis (dodecylphenyl) phosphite, bis (nonylphenyl) neodecyl phosphite, bis (nonylphenyl) beta naphthyl phosphite, bis (nonylphenyl) isodecyl phosphite, triphenyl phospihte, tris (phenyldodecyl) phosphite, tris (phenylnonyl) phosphite, tris (phenyloctyl) phosphite, tris (phenylpentyl) phosphite, tris (phenylbutyl) phosphite, bis (phenyldodecyl) phenyloctyl phosphite, bis (phenylbutyl) phenyldodecyl phosphite, bis (phenyldodecyl) phenylbutyl phosphite and the like.

Such phosphites are known to stabilize polyether polyurethanes as described in U.S. Pat. 3,009,939, but such stabilizers have been, at the most ineffective in thermally stabilizing an oxymethylene polymer, as hereinafter demonstrated. Surprisingly, the subject phosphites not only stabilize the urethane, ester and/or ether linkages but are unexpectedly successful in stabilizing the recurring oxymethylene units in the polymer chain.

The phosphites of the subject invention may be added to the oxymethylene composition in amounts up to about 2.5 weight percent, preferably up to about 1.2 weight percent and most preferred from about 0.25 to about 1.0 weight percent. It is understood that higher levels may be employed. However it is not commercially advisable for a number of reasons, two of which are cost and at higher amounts the stabilizer begins to act also as a plasticizer which disrupts the certain physical properties of the desired composition.

The phosphite may be added to the composition at any time, either with the base oxymethylene polymer prior to the addition of the modifying component (e.g. an isocyanate terminated composition) or even after the formation of the entire modified polyoxymethylene composition. Even though the phosphite may be added at any time it is preferred that the receiving composition be heated at the time of addition. The temperature of the modified polyoxymethylene composition at the time of addition should be from about 120° C. to about 230° C. and preferably from about 140° C. to about 165° C. and the entire composition should be in intimately admixed to insure a proper distribution of the stabilizer in the polymeric composition. Most preferred, the temperature of the modified polyoxymethylene composition at the time of addition is of its flux temperature.

The subject phosphite stabilizers as hereinafter demonstrated are effective in improving the resistance of the modified oxymethylene polymers both with respect to pyrolytic and oxidative degradation, without the presence of addition components to make up a stabilizing system; this does not mean, however, that the entire composition would not accept additional stabilizers. It is understood that the claimed compositions could contain additional additives such as accelerators, activators, fillers, curing agents, cross linking agents, antioxidants, pigments, metal oxides, carbon black, lubricants, dyes, plasticizers and the like. A preferred stabilizer system comprises a phosphite, a small amount of a metal oxide (e.g. magnesium oxide, zinc oxide and the like) and an ultraviolet light absorber such as a substituted benzotriazole.

The non obvious result of the instantly claimed invention is demonstrated in the following examples by means of a melt index curve. A Tinius Olsen Melt Indexer was used in the examples at a temperature of 230° C. with a 2040 gram standard weight and 2 standard die (end to end) with a 0.080 inch orifice having therefore an $L/D$ of 7.46. A 7 gram sample was taken and extruded, cutting the extrudate at various time intervals. A melt index curve was constructed by plotting the logarithm of the weights of the extrudate (in milligrams) versus the time (in minutes) in which the sample was collected. The slope of the curve gave the "melt index stability at 230° C." ($MIS^{230}$) as a measure of the change of melt index with time. A comparision of the "MIS's" obtained with different stabilizers allowed the comparision of their relative stabilizing action. As a means of interpreting the above test data, the most desirable slope to have woud be zero (or a horizontal line) indicating no weight change over a given period of time. The least desirable slope would be infinity, which indicates that the weight experiences a great deterioration over a very short period of time. It has been found that the stabilized compositions of the instant invention exhibit a slope in the order of $1 \times 10^{-4}$ to about $25 \times 10^{-4}$.

EXAMPLE I

A polyoxymethylene composition containing equimolar amounts of a polyoxymethylene copolymer (Celcon M-90 produced by Celanese Corporation and containing a minor amount of oxyethylene links) and an isocyanate terminated polyurethane having an elongation value of 450% measured according to ASTM D412 (Texin 591 A produced by Mobay Chemical Co. which is end-capped with isocyanate groups) and 1 percent by weight based on the composition of a mixture of tris (mono and di-nonylphenyl)phosphite (Uvinox 3100 produced by G.A.F.) was extruded as hereinbefore described. A melt index of 9.1 was obtained and the slope of the curve which gives the melt index stability at 230° C. was $1.1 \times 10^{-4}$.

EXAMPLE II

The composition of Example I was employed except tris (mono nonyl phenyl) phosphite was substituted for the mixture in the amount of 1.5 percent by weight based on the composition. A melt index of 6.7 was obtained and the slope of the curve which gives the melt index stability at 230° C. was $2.1 \times 10^{-4}$.

EXAMPLE III

The composition of Example I was employed except triphenyl phosphite was substituted for the mixture in the amount of 0.5 percent by weight based on the composition. A melt index of 4.7 was obtained and the slope of the curve which gives the melt index stability at 230° C. was $1.9 \times 10^{-4}$.

EXAMPLE IV

The composition of Example I was employed except 0.5 percent by weight of a stabilizer system of cyanoquanidine, 2,2' - methylene bis-(4-methyl-6-tertiary butyl phenol) and magnesium oxide was substituted for the mixture and a melt index of 35 was obtained and the slope of the curve which gives the melt index stability at 230° C. was $54 \times 10^{-4}$.

EXAMPLE V

The composition of Example I was employed except no stabilizer was employed. A melt index of 50 was obtained and the slope of the curve which gives the melt index stability at 230° C. was $120 \times 10^{-4}$.

EXAMPLE VI

The composition of Example I was employed except a stabilizer system of dinonyl phosphite, benzophenone and magnesium oxide was employed wherein said phosphite was present in the amount of 0.5 percent by weight based on the composition. A melt index of 7 was obtained and the slope of the curve which gives the melt index stability at 230° C. was $8.0 \times 10^{-4}$.

EXAMPLE VII

The same as Example VI, except 1.0 percent by weight of dinonyl phosphite was employed and a melt index of 7 and a slope of $8.0 \times 10^{-4}$ measured at 230° C. was obtained.

EXAMPLE VIII

A polyoxymethylene copolymer (Celcon M-90) and 1.0 percent by weight of a mixture of tris (mono and di-nonylphenyl) phosphite intimately admixed therewith was extruded as hereinbefore described. A melt index of greater than 500 was obtained and the slope of the curve which gives the melt index stability at 230° C. was not measurable since the melt index which was originally very high increased too rapidly for measurement.

EXAMPLE IX

A polyoxymethylene copolymer (Celcon M-90) which has been end-capped with diphenyl methane 4,4' diisocyanate was intimately admixed with 1.0 percent by weight of a mixture of tris (mono and di-nonylphenyl) phosphite and extruded as above. A melt index of greater than 500 was obtained and the slope of the curve which gives the melt index stability at 230° C. was not measurable since the melt index which was orginally very high, increased too rapidly for measurement.

EXAMPLE X

The composition of Example I was employed except trinonyl phosphite is substituted for the mixture in the amount of 1.0 percent by weight based on the composition. A melt index of 15 is obtained and the slope of the curve which gives the melt index stability at 230° C. is $25 \times 10^{-4}$.

EXAMPLE XI

The composition of Example I was employed except tris (trimethyolpropane) phosphite is substituted for the mixture in the amount of 1.0 percent by weight based on the composition. A melt index of 10 is obtained and the slope of the curve which gives the melt index stability at 230° C. is $2.3 \times 10^{-4}$.

EXAMPLE XII

The composition of Example I was employed except di(nonyl phenyl) neodecyl phosphite is substituted for the mixture in the amount of 1.0 percent by weight based on the composition. A melt index of 12 is obtained and the slope of the curve which gives the melt index stability at 230° C. is $5 \times 10^{-4}$.

It is to be understood that the foregoing detailed description is given merely by way of illustration and that many variations may be made therein without departing from the spirit of our invention.

What we claim is:

1. A modified oxymethylene polymer composition comprising
(a) a modified oxymethylene polymer of the structure;

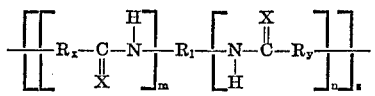

wherein $R_x$ is the residue of an oxymethylene polymer segment having at least 60% recurring oxymethylene units and having terminal groups containing at least one active hydrogen atom as determined by the Zerewitnoff method, $R_y$ is the residue of a dissimilar organic polymer segment having terminal groups containing at least one active hydrogen atom as determined by the Zerewitnoff method, X is an atom selected from the group consisting of oxygen and sulfur atoms, $R_1$ is an organic radical selected from the group consisting of divalent and trivalent aliphatic, cycloaliphatic and aromatic radicals having up to about 20 carbon atoms, $m$ and $n$ are integers from one to two, $m$ plus $n$ is an integer from two to three, and Z is an integer from one to one hundred and
(b) an organic phosphite of the structure;

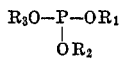

wherein $R_1$, $R_2$ and $R_3$ are organic radicals selected from the group consisting of alkyl containing from about 4 to about 12 carbon atoms, alkenyl of from about 6 to about 12 carbon atoms, cyclic alkyl aryl, alkyl mono and di substituted aryl, aryl substituted alkyl, and aryl wherein alkyl is from 4 to about 12 carbon atoms and aryl is 6 or 10 carbon atoms.

2. The composition of claim 1 wherein said organic phosphite is present in amounts of up to about 2.5 weight percent based upon the modified oxymethylene polymer.

3. The composition of claim 2 wherein said organic phosphite is tris (dinonylphenyl) phosphite.

4. The process for stabilizing a previously prepared modified oxymethylene polymer of the structure

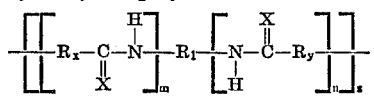

wherein $R_x$ is the residue of an oxymethylene polymer segment having at least 60% recurring oxymethylene units and having terminal groups containing at least one active hydrogen atom as determined by the Zerewitnoff method, $R_y$ is the residue of a dissimilar organic polymer segment having terminal groups containing at least one active hydrogen atom as determined by the Zerewitnoff method, X is an atom selected from the group consisting of oxygen and sulfur atoms, $R_1$ is an organic radical selected from the group consisting of divalent and trivalent aliphatic, cycloaliphatic and aromatic radicals having up to about 20 carbon atoms, $m$ and $n$ are integers from one to two, $m$ plus $n$ is an integer from two to three, and Z is an integer from one to one hundred which comprises adding a stabilizer of the structure

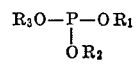

wherein $R_1$, $R_2$ and $R_3$ are organic radicals selected from the group consisting of alkyl containing from about 4 to about 12 carbon atoms, alkenyl of from about 6 to about 12 carbon atoms, cyclic alkyl aryl, alkyl mono and di substituted aryl, aryl substituted alkyl, and aryl wherein alkyl is from about 4 to about 12 carbon atoms, and aryl is 6 or 10 carbon atoms, to a modified oxymethylene polymer at a temperature of from about 125° C. to about 230° C.

5. The process of claim 4 wherein said stabilizer is added in amounts of up to about 2.5 weight percent based upon the modified oxymethylene polymer at a temperature of from about 140° C. to about 165° C.

6. The process of claim 4 wherein said stabilizer is tris (dinonylphenyl) phosphite.

References Cited

UNITED STATES PATENTS

| | | | |
|---|---|---|---|
| 2,915,496 | 12/1959 | Swart et al. | 260—45.7 |
| 3,213,058 | 10/1965 | Boyle et al. | 260—47 |
| 3,272,891 | 9/1966 | Millionis et al. | 260—895 |
| 3,293,207 | 12/1966 | Perry | 260—45.7 |
| 3,313,771 | 4/1967 | Dressler et al. | 260—45.85 |
| 3,318,841 | 5/1967 | Tomlinson et al. | 260—45.75 |
| 3,322,719 | 5/1967 | Peilstocker | 260—45.8 |
| 3,325,448 | 6/1967 | Tanaka et al. | 260—45.75 |
| 3,337,356 | 8/1967 | Carboni | 106—176 |
| 3,355,422 | 11/1967 | Brindell | 260—45.85 |
| 3,364,157 | 1/1968 | Halek et al. | 260—13 |
| 2,733,226 | 1/1956 | Hunter | 260—29.7 |

DONALD E. CZAJA, Primary Examiner

R. A. WHITE, Assistant Examiner

U. S. Cl. X.R.

260—13, 45.7 P, 45.75 R, 45.8 N, 45.9 P, 45.95, 67 FP